(12) United States Patent
O'Neill

(10) Patent No.: US 10,118,659 B1
(45) Date of Patent: Nov. 6, 2018

(54) UNIVERSAL COVER FOR BICYCLES ON HITCH-MOUNTED RACK

(71) Applicant: Christopher O'Neill, Westminster, CO (US)

(72) Inventor: Christopher O'Neill, Westminster, CO (US)

( * ) Notice: Subject to any disclaimer, the term of this patent is extended or adjusted under 35 U.S.C. 154(b) by 0 days.

(21) Appl. No.: 15/253,475

(22) Filed: Aug. 31, 2016

(51) Int. Cl.
*B60R 9/10* (2006.01)
*B62J 19/00* (2006.01)
*B60R 9/06* (2006.01)

(52) U.S. Cl.
CPC ............... *B62J 19/00* (2013.01); *B60R 9/06* (2013.01); *B60R 9/10* (2013.01)

(58) Field of Classification Search
CPC ............ B62J 19/00; B60R 9/10; B60R 9/06
USPC ........................................................ 296/136.1
See application file for complete search history.

(56) References Cited

U.S. PATENT DOCUMENTS

| | | |
|---|---|---|
| 3,886,988 A | 6/1975 | Garrett et al. |
| 3,968,913 A | 7/1976 | Weed et al. |
| 4,009,744 A * | 3/1977 | Joslyn ................. B60R 9/10 |
| | | 150/167 |
| 4,356,831 A | 11/1982 | Adams |
| 4,598,725 A | 7/1986 | Brewer |
| 4,715,646 A | 12/1987 | Goffi et al. |
| 5,282,502 A | 2/1994 | Ballard |
| 5,372,169 A * | 12/1994 | Norton .................... B62J 19/00 |
| | | 150/167 |
| 5,445,200 A | 8/1995 | Celestino et al. |
| 5,662,372 A * | 9/1997 | Lubkeman ............... A41D 3/08 |
| | | 150/166 |
| 5,738,262 A | 4/1998 | Andrini |
| 5,921,389 A | 7/1999 | Zoffer |
| 5,950,891 A | 9/1999 | Brungardt et al. |
| 6,040,764 A | 3/2000 | Crisci |
| 6,405,771 B1 * | 6/2002 | Mote ....................... B62J 19/00 |
| | | 150/167 |
| 8,881,776 B2 | 11/2014 | Waters |
| 9,248,953 B2 | 2/2016 | Pelegrin |
| 9,266,004 B2 | 2/2016 | Shirk, II |
| 2004/0173652 A1 | 9/2004 | Busta |
| 2005/0247387 A1 | 11/2005 | Hooker et al. |
| 2011/0036474 A1 | 2/2011 | Phillips |
| 2014/0182756 A1 | 7/2014 | Nicholson |
| 2015/0060315 A1 | 3/2015 | Waters |

* cited by examiner

*Primary Examiner* — Pinel E Romain
(74) *Attorney, Agent, or Firm* — Ramon L. Pizarro; Edwin H. Crabtree

(57) ABSTRACT

A flexible enclosure that is adapted for encapsulating bicycles and the rack that supports the bicycles from the receiver of a receiver hitch. The enclosure includes a front panel and a rear panel. The front panel includes a pair of apertures that lead to a pair of spaced apart pockets with a flexible translucent window, so that the enclosure may be used to cover items that are supported from the receiver hitch, so that items inside the pockets may be seen through the section of flexible translucent material.

3 Claims, 3 Drawing Sheets

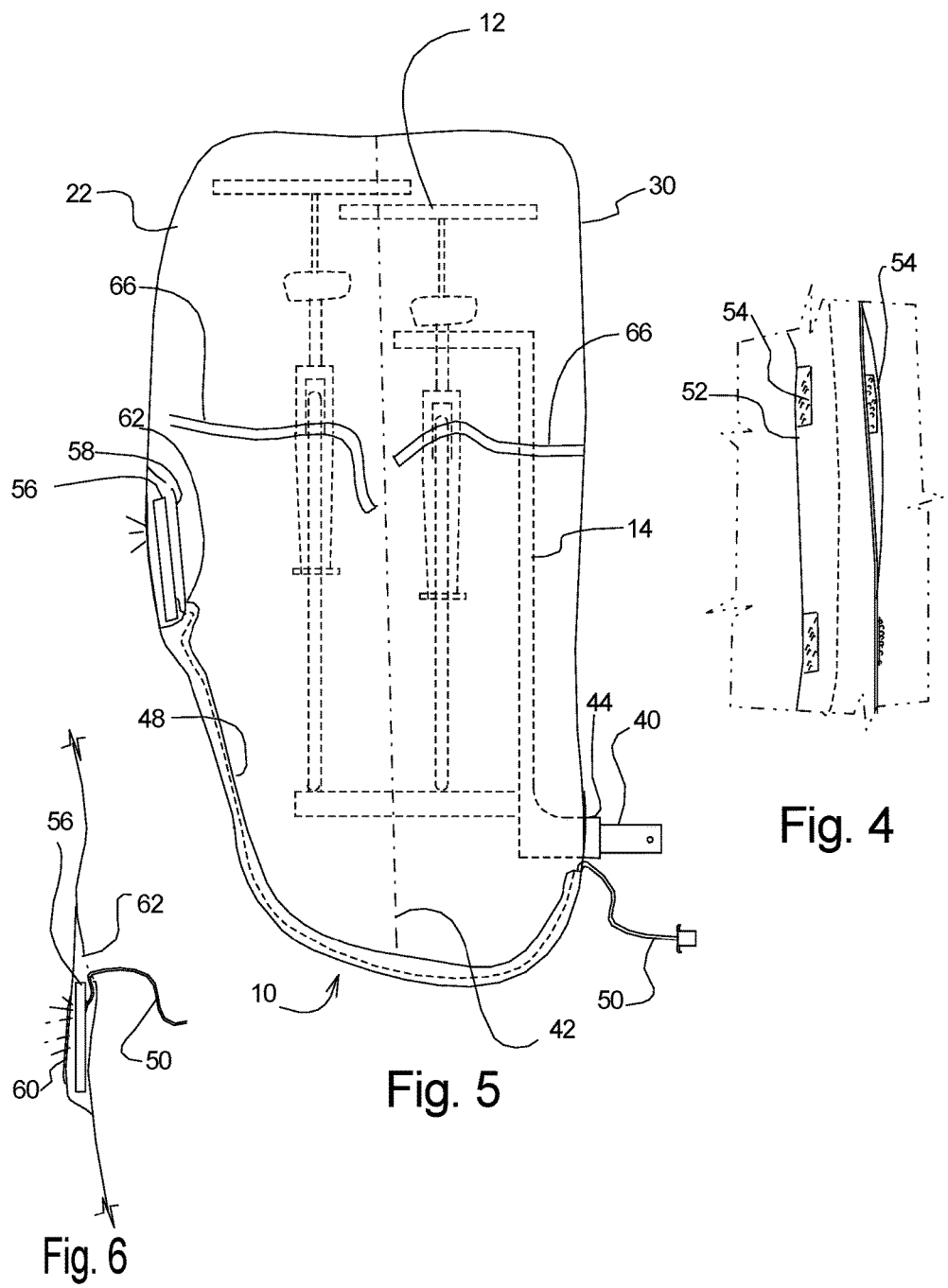

UNIVERSAL COVER FOR BICYCLES ON HITCH-MOUNTED RACK

BACKGROUND OF THE INVENTION

(A) Field of the Invention

This application relates to a system for protecting bicycles from dirt, mud, and other materials that may impact the bicycles while being carried on a bumper or hitch-mounted bicycle rack or platform.

(b) Discussion of Known Art

Cycling enthusiasts often need to carry their bicycles to scenic or enjoyable cycling destination. The transport of the bicycles is often accomplished on bicycle racks that are mounted from the receiver hitch that is mounted from a transport vehicle. An example of this type of bicycle rack is found in U.S. Pat. No. 5,950,891 to Brungardt et al., incorporated herein by reference in its entirety. Another example of a receiver hitch-mounted rack is disclosed in U.S. Pat. No. 8,210,408 to Sautter et al., incorporated herein by reference in its entirety.

A problem created by transporting bicycles on a receiver-hitch mounted rack is that the bicycles are exposed and accessible to the elements and clearly visible to thieves. Accordingly, this leaves the bicycles vulnerable to damage and to theft.

In order to address these types of issues some designers have developed bags with integral support platforms and wheels. Examples of these types of devices can be found U.S. Pat. No. 8,196,740 to Jacques et al. and European Publication EP 2,814353 B1 to Noer et al. (which has also been filed with the U.S.P.T.O. as U.S. application Ser. No. 14/398,182).

Another approach, discussed in U.S. Pat. No. 3,968,913 to Weed, incorporated herein by reference in its entirety, uses a flexible bag that has apertures for rigid rack components that support the bicycles being carried. The bag extends over at least a portion of the rigid rack components and over bicycles mounted from the rack. This approach, which is based on the use of a flexible bag that does not use an integral support platform, but is adapted for extending around and encapsulating the support platform and other support components, has important advantages. One of these advantages is that the flexible bag can accommodate a grater range of variation in the design or configuration of the bicycles being carried. For example, for one trip a bicycle being carried may be fitted with a basket or tray over the rear wheel or a child carrier, and a second bicycle being carried at the same time may have prominent handlebars. For another trip, the rack may be used to support just one bicycle, or a pair of road bicycles with narrow handlebars. Accordingly, the user of the bicycle rack would benefit from the flexibility of a bag that encapsulates and accommodates a variety of bicycle styles and accessories mounted on the bicycles.

A problem associated with bags that encapsulate the supporting rack and the bicycles is that the bag and bicycles may extend over the taillights of the vehicle, making it illegal or dangerous to use these systems on public roads.

A limitation associated with systems that use a bag that is integral, or adapted for engagement to, a bicycle-support platform is that these systems are not easily adaptable to varied types, sizes, or number of bicycles being carried.

Still further, systems that are designed for use a specific support platform provide the advantage of allowing the provision of wheels to the platform, but this advantage comes at the cost of having use the platform and the cover of a specific manufacturer. In other words, these devices result in waste to the consumer who has to replace his entire rack in order to gain the benefit of having the bicycle protected during transport.

Therefore, a review of known devices reveals that there remains a need for a cover that can accommodate a variety of hitch-mounted bicycle racks while carrying a variety of bicycles with different accessories, such as child seats or different handlebars.

SUMMARY

It has been discovered that the problems left unanswered by known art can be solved by providing a flexible enclosure that is adapted for encapsulating bicycles and the rack that supports the bicycles from a receiver hitch through a drawbar. An example of the enclosure includes:

A front panel with a front lower portion and front panel edges that extend up from the lower portion, the edges and the lower portion of the front panel defining a front panel perimeter;

A rear panel with a rear panel lower portion and rear panel edges that extend up from the lower portion, the edges and the lower portion of the front panel defining a front panel perimeter, the front panel lower portion being connected to the rear panel lower portion, the front panel edges being attachable to the rear panel edges, the rear panel further having an aperture that is adapted for close engagement with the drawbar. The front panel also includes a pair of spaced apart pockets, each of the pockets including a section that is made of a flexible translucent material, so that the enclosure may be used to cover items that are supported from the receiver hitch.

It should also be understood that while the above and other advantages and results of the present invention will become apparent to those skilled in the art from the following detailed description and accompanying drawings, showing the contemplated novel construction, combinations and elements as herein described, and more particularly defined by the appended claims, it should be clearly understood that changes in the precise embodiments of the herein disclosed invention are meant to be included within the scope of the claims, except insofar as they may be precluded by the prior art.

DRAWINGS

The accompanying drawings illustrate preferred embodiments of the present invention according to the best mode presently devised for making and using the instant invention, and in which:

FIG. 4 illustrates an example of a channel for carrying the wiring for the rear lights used with an example of the disclosed invention.

FIG. 5 is a section view of the flexible enclosure while covering bicycles mounted from a drawbar that cooperates with a receiver hitch on a vehicle, and thus the view is taken looking towards a side of the vehicle.

FIG. 6 is a section view looking towards side of the vehicle, and further illustrates details of the pockets and lighting of an example disclosed here.

DETAILED DESCRIPTION OF PREFERRED EXEMPLAR EMBODIMENTS

While the invention will be described and disclosed here in connection with certain preferred embodiments, the description is not intended to limit the invention to the specific embodiments shown and described here, but rather the invention is intended to cover all alternative embodiments and modifications that fall within the spirit and scope of the invention as defined by the claims included herein as well as any equivalents of the disclosed and claimed invention.

Figure 1:
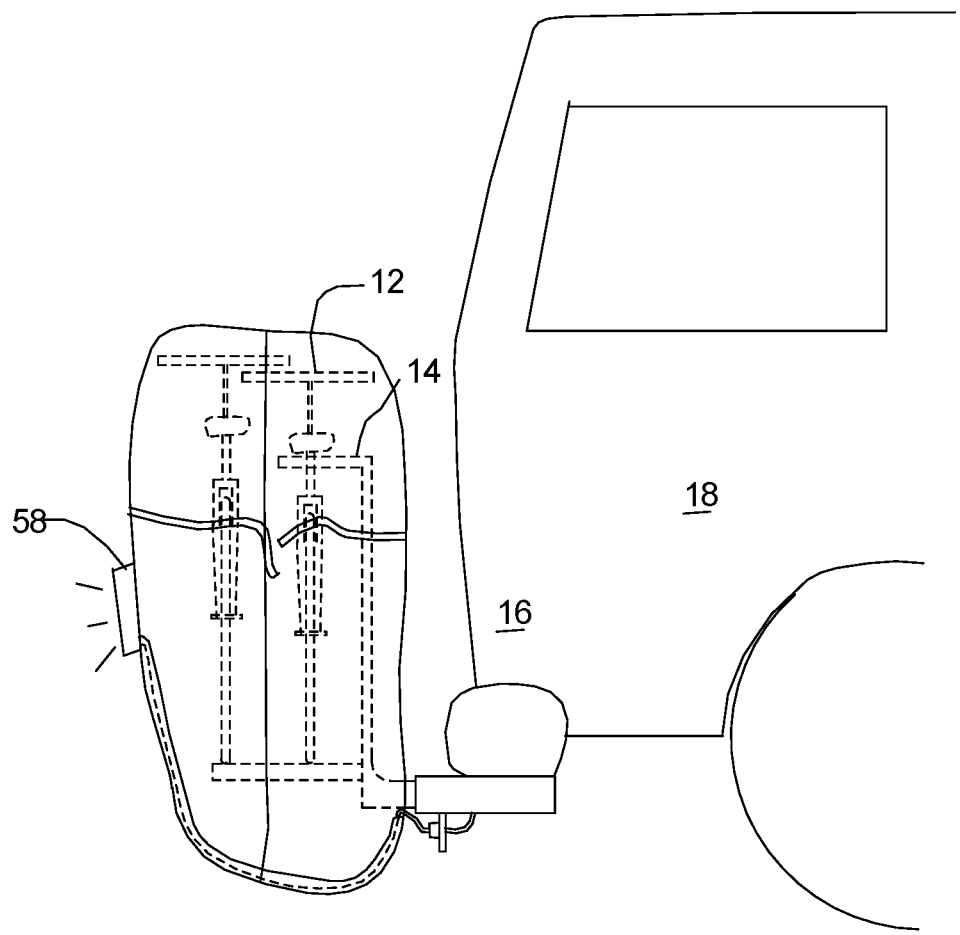
FIG. 1 is a side perspective view of an embodiment of an embodiment of the invention while in use over bicycles supported from a receiver hitch on the back of a vehicle.

Attention is now directed to FIG. 1, where a flexible enclosure 10 is known while in use, covering items 12 being carried on a rack 14 that is mounted from the back 16 of a vehicle 18. It is contemplated that the rack 14 will be a rack that has been configured for supporting bicycles, for example, racks such as the rack shown in U.S. Pat. No. 7,832,607, incorporated herein in its entirety by reference, or the rack shown in U.S. Pat. No. 8,602,279, also incorporated herein in its entirety by reference. These examples of bicycle racks are mounted from a trailer hitch, typically a "receiver hitch", which as a square or rectangular female receiver that accepts a male support for the bicycle rack. The vehicle's receiver hitch installation will also typically include electrical power connectors, which provide the electrical impulses or power for operating the lights or brakes of a trailer, when a trailer is being towed by the vehicle.

As can be understood from FIG. 1, the flexible enclosure 10 is particularly well suited for encapsulating bicycles 20 that are supported from the rack 14, the rack 14 being supported from the receiver hitch 20.

Figure 2:
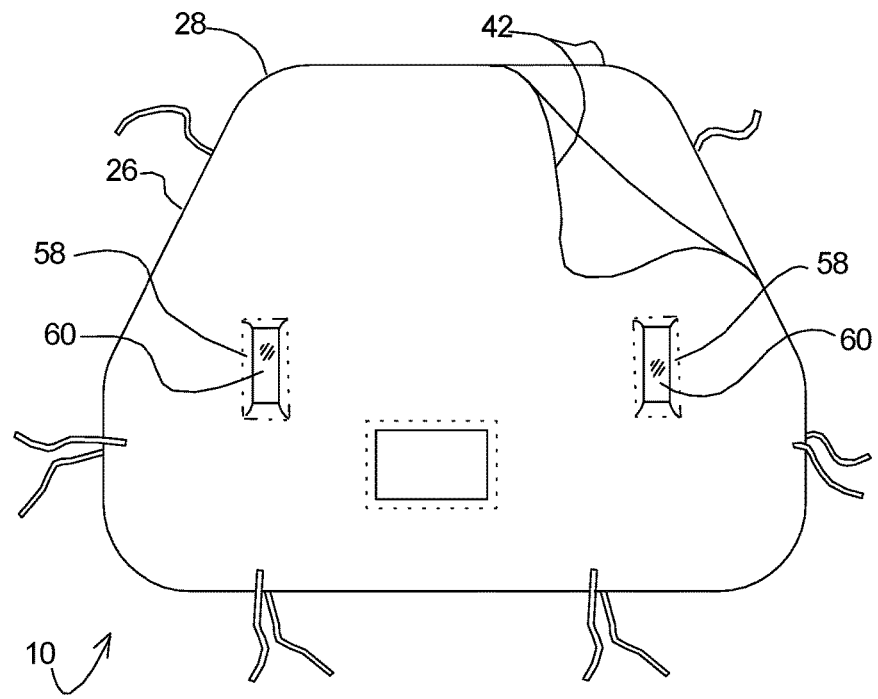
FIG. 2 shows the arrangement of panels used to create a bag as disclosed here.
Figure 3:
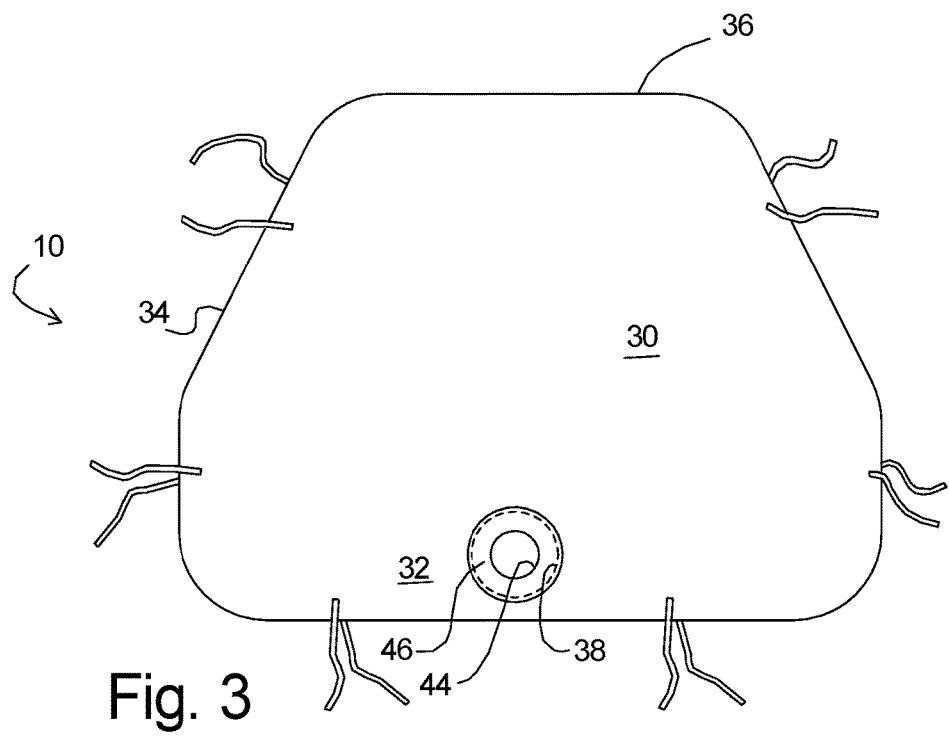
FIG. 3 is a view of the front panel, which extends between the bicycles and the vehicle when in use.

Referring now to FIGS. 1-3, it will be understood that an example of the disclosed flexible enclosure 10 will include a front panel 22 with a front lower portion 24 and front panel edges 26. As can be understood from FIGS. 2-3, the front panel edges 26 extend up from the front panel lower portion 24 and over the front panel lower portion 24. Additionally, the front panel edges 26 along with the front panel edges 26 and the front panel lower portion 24 define a front panel perimeter 28.

FIGS. 2-3 also show that the disclosed flexible enclosure 10 will include a rear panel 30 with a rear panel lower portion 32 with rear panel edges 34 that extend up from the rear panel lower portion 32. FIG. 2 illustrates that the rear panel edges 34 and the rear panel lower portion 42 define a rear panel perimeter 36. FIG. 1 shows that the rear panel lower portion 32 and the front panel lower portion 26 are attached to one another. Additionally, the front panel edges 26 will be attachable to the rear panel edges 34 through the use of a zipper 42, or another suitable closure device, such as hook and loop material, or simply straps.

Referring now to FIGS. 3-6, it will be understood that the rear panel 30 will preferably include an aperture 44 that is adapted for accepting and providing close engagement with the drawbar 40. According to a preferred embodiment, the aperture 44 will include a flexible seal 46, which may be a rubber seal, or a seal made from flexible sheet of material with radial slits that facilitate the insertion of the drawbar 40 though the aperture 44.

It will be understood that the use of the flexible seal 46 will prevent intrusion of road debris and moisture into the enclosure 10. Additionally, it is contemplated that channel 48 will be provided from a location next to the flexible seal 46, and extend towards the front panel 22. The channel 48 will extend to and along the front panel 22. The channel 48 will be used to retain signal wiring 50. The signal wiring 50 will connect to the taillight connector and wiring of the vehicle 18. Examples of taillight connectors and wiring are discussed in U.S. Pat. No. 5,593,170, incorporated herein by reference in its entirety.

More specifically, the disclosed flexible enclosure 10 solves problems associated with inadvertent blocking of the vehicle's taillights by integrating or supporting taillights from the front panel 22. Referring to FIGS. 2, and 4-6, it will be understood that a preferred example will provide a ribbon or section of channel material 52, which may be a strip of vinyl or other suitable tough, flexible material, and provide a closure connector 54, which may be one or more sections of mating hook and loop material, snaps, or other devices that allow the section of channel material 52 to be wrapped around taillight wiring to create the channel 48 that extends along the panels of the flexible enclosure 10, and thus house the wiring from the drawbar aperture 44 to the respective taillight or license plate light.

Accordingly, FIGS. 2 and 6 reveal that it is contemplated that taillights 56 will be supported from spaced apart pockets 58. The pockets will include a panel 60 of a flexible translucent or transparent material, which will allow following vehicles to see changes in the illumination of the taillights 56, which will be held within the pockets 58. Electrical power to the taillights will be carried into the pockets 58 through apertures in the front panel 22.

Additionally, as shown in FIG. 2, a license plate pocket 64 with lighting and wiring may also be provided, and thus allow proper display of the license plate while using the disclosed flexible enclosure.

It has also been discovered that the disclosed structure will also allow the provision of tightening straps 66, which will allow the entire enclosure to be cinched tightly against the bicycles and other contents within the flexible enclosure 10. The tightening of the bag against the contents will prevent rubbing of the fabric of the flexible enclosure 10 against the painted surfaces of bicycles and other continents, and thus prevent damage to the items being carried within the flexible enclosure 10.

Thus it can be appreciated that the above-described embodiments are illustrative of just a few of the numerous variations of arrangements of the disclosed elements used to carry out the disclosed invention. Moreover, while the invention has been particularly shown, described and illustrated in detail with reference to preferred embodiments and modifications thereof, it should be understood that the foregoing and other modifications are exemplary only, and that equivalent changes in form and detail may be made without departing from the true spirit and scope of the invention as claimed, except as precluded by the prior art.

What is claimed is:

1. A flexible enclosure that is adapted for encapsulating bicycles and a rack that supports the bicycles from a receiver of a receiver hitch, the enclosure comprising:
    a front panel with a front lower portion and front panel edges that extend up from the lower portion and over the lower portion, the front panel edges and the front panel lower portion defining a front panel perimeter;
    a rear panel with a rear panel lower portion and rear panel edges that extend up from the rear panel lower portion, the rear panel edges and the rear panel lower portion defining a rear panel perimeter, the rear panel lower portion being connected to the front panel lower portion, the front panel edges being attachable to the rear panel edges, the rear panel further having an aperture that is adapted for close engagement with the drawbar;

the front panel further comprising a pair of apertures, each aperture leading to a pair of spaced apart pockets, each of the pockets including a section that is made of a flexible translucent material, so that the enclosure may be used to cover items that are supported from the receiver hitch, so that items inside the pockets may be seen through the section of flexible translucent material.

2. A flexible enclosure that is adapted for encapsulating bicycles and a rack that supports the bicycles from a receiver of a receiver hitch to protect the bicycles and the rack during transport, the enclosure comprising:

a flexible front panel with at least one tightening strap, a front lower portion and front panel edges that extend up from the lower portion and over the lower portion, the front panel edges and the front panel lower portion defining a front panel perimeter;

a flexible rear panel with at least one tightening strap, a rear panel lower portion and rear panel edges that extend up from the rear panel lower portion, the rear panel edges and the rear panel lower portion defining a rear panel perimeter, the rear panel lower portion being connected to the front panel lower portion, the front panel edges being attachable to the rear panel edges, the rear panel further having an aperture that includes a resilient grommet that provides close engagement of the grommet and the drawbar;

the front panel further comprising a pair of apertures, each aperture leading to a pair of spaced apart pockets, each of the pockets including a section that is made of a flexible translucent material, so that the enclosure may be used to cover items that are supported from the receiver hitch, so that items inside the pockets may be seen through the section of flexible translucent material.

3. A flexible enclosure that is adapted for encapsulating bicycles and a rack that supports the bicycles from a receiver of a receiver hitch to protect the bicycles and the rack during transport, the enclosure comprising:

a flexible front panel with at least one tightening strap, a front lower portion and front panel edges that extend up from the lower portion and over the lower portion, the front panel edges and the front panel lower portion defining a front panel perimeter;

a flexible rear panel with at least one tightening strap that is positioned at a location that aligns with the tightening strap on the flexible front panel, so that the tightening straps allow cinching the panels towards one another to cinch the panels towards one another, a rear panel lower portion and rear panel edges that extend up from the rear panel lower portion, the rear panel edges and the rear panel lower portion defining a rear panel perimeter, the rear panel lower portion being connected to the front panel lower portion, the front panel edges being attachable to the rear panel edges, the rear panel further having an aperture that includes a resilient grommet that is attached to the rear panel and provides close engagement of the grommet and the drawbar;

the front panel further comprising a pair of apertures, each aperture leading to a pair of spaced apart pockets, each of the pockets including a section that is made of a flexible translucent material, so that the enclosure may be used to cover items that are supported from the receiver hitch, so that items inside the pockets may be seen through the section of flexible translucent material.

\* \* \* \* \*